June 4, 1929.  W. M. MINYARD  1,716,236
MILK BOTTLE CARRIER
Filed April 28, 1928
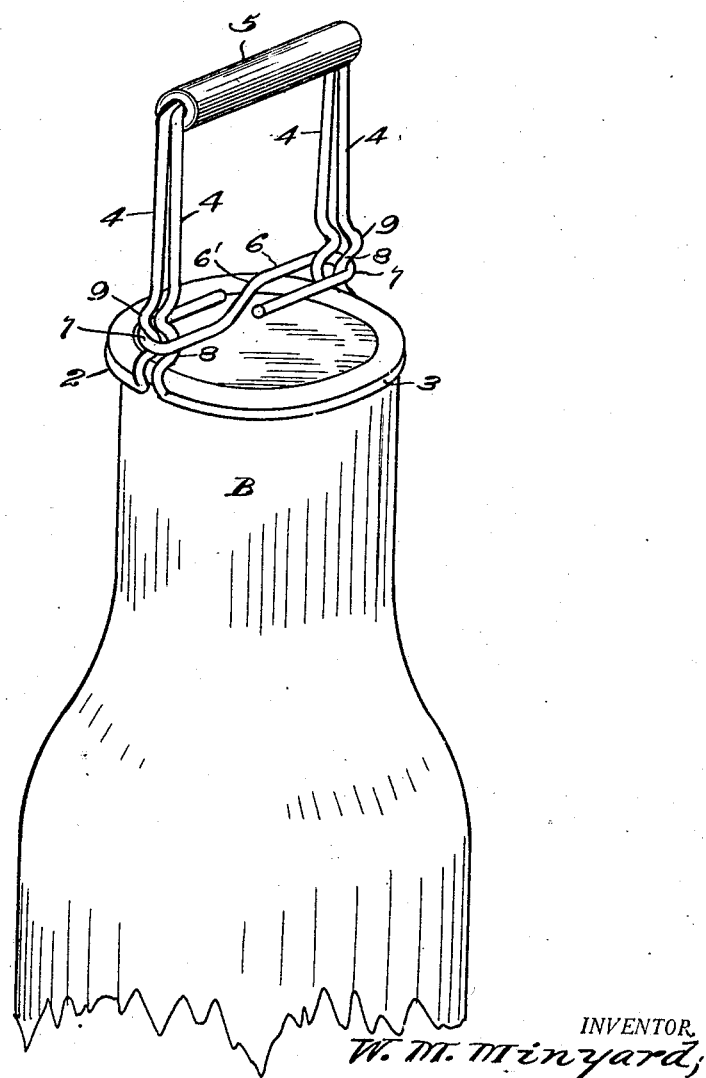
INVENTOR
W. M. Minyard,
BY
F. E. Maynard
ATTORNEY Patented June 4, 1929.

1,716,236

UNITED STATES PATENT OFFICE.

WILLIAM MARION MINYARD, OF LOS ANGELES, CALIFORNIA.

MILK-BOTTLE CARRIER.

Application filed April 28, 1928. Serial No. 273,553.

This invention relates to article carrying devices and more especially to means for conveniently carrying commercial milk bottles in which milk is retailed.

It is an object of the invention to provide a very simple yet practical and reliable and substantial handle and grip device for ready application to the beaded neck of a common milk bottle.

Further, an object is to provide a safety means to fasten the grip means in closed position.

Another object is to provide a carrier of very low cost and of light weight, and which is adaptable as a freely given advertising medium.

Other objects, advantages and features of construction and details of means will be made manifest in the ensuing specification of the herewith illustrative embodiment; it being understood that modifications, variations and adaptations may be resorted to within the spirit, scope and principle of the invention as it is more directly hereinafter claimed.

The drawing is a perspective of the device as applied.

The carrier consists of a pair of opposed, duplicate semicircular bows 2 and 3, in a common plane, to be closed end toward end to form a ring or collar around the neck of a bottle B.

The adjacent ends of the pair of bows are provided with upturned or perpendicular bars 4 constituting handle shanks. These are inturned at the top and journaled in a tube 5 forming the handle of the device.

When the carrier is closed around the bottle neck it is held in gripping position by a sliding bridle 6 having end hooks 7 which are closed around the adjacent pairs of handle bars 4—4.

In order to avoid accidental opening of the bows the bars 4 have indented seats 8 just above the bows and below out bent humps 9 over which the bridle 6 may be pressed to the seats 8.

Resilient elongation of the bridle is achieved by joining the hooks 7 by a diagonal portion 6' formed in the member 6. This, plus the spring or resiliency of the bars 4, will admit of the shifting of the bridle to and from the seats 8.

What is claimed is:

1. A milk bottle carrier including a pair of half-rings to embrace the neck of a bottle under its rim bead, each half-ring having integral, perpendicular bar parts, a handle member at the upper ends of the bars and in which the bars are journaled, and a sliding cross-bridle embracing all of the bars just above the opposed half-rings to close them onto the bottle neck.

2. A milk bottle carrier including a pair of half-rings to embrace the neck of a bottle, each half-ring having perpendicular bars on its ends, handle means at the upper ends of the bars, and a sliding cross-bridle embracing the bars to close them on the bottle neck; said bars having locking humps to removably detain the bridle in closing position.

3. A milk bottle carrier including a pair of ring forming bows with upstanding bars on their ends, said bars being journaled in a handle tube, means slidable along the bars to bring them to ring position, and hump and seat parts in the bars to prevent accidental separation of the bows while embracing a bottle neck.

4. A milk bottle carrier including a pair of ring forming bows having upstanding handle bars on their ends, means slidable along the bars to bring them to ring forming position; said means including a double hook bridle cross-connecting the bars of the bows and a diagonal portion joining the hooks, and hump and seat parts formed in the bars to co-act with the hooks and detain them in adjusted position.

WILLIAM MARION MINYARD.